United States Patent
Lee et al.

(10) Patent No.: US 9,407,828 B2
(45) Date of Patent: Aug. 2, 2016

(54) WIDE DYNAMIC RANGE CMOS IMAGE SENSOR AND IMAGE SENSING METHOD

(71) Applicant: ZEEANN CO., LTD., Gyeongi-Do (KR)

(72) Inventors: Jawoong Lee, Gyeonggi-Do (KR); Junhee Cho, Chungcheonbuk-Do (KR); Byounghwan Choi, I, Chungcheongbuk-Do (KR)

(73) Assignee: Zeeann Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/877,196

(22) Filed: Apr. 1, 2013

(65) Prior Publication Data
US 2015/0189145 A1    Jul. 2, 2015

Related U.S. Application Data

(63) Continuation of application No. PCT/KR2011/007436, filed on Oct. 7, 2011.

(30) Foreign Application Priority Data

Oct. 8, 2010   (KR) .................. 10-2010-0098304

(51) Int. Cl.
*H04N 5/335* (2011.01)
*H01L 29/66* (2006.01)
(Continued)

(52) U.S. Cl.
CPC ........... *H04N 5/2352* (2013.01); *H04N 5/2351* (2013.01); *H04N 5/2353* (2013.01);
(Continued)

(58) Field of Classification Search
CPC ..... H04N 5/3742; H04N 5/341; H04N 5/353; H04N 5/3532; H04N 5/37455; H04N 5/378
USPC .................. 348/241, 243, 302, 308; 257/239; 250/208.1
See application file for complete search history.

(56) References Cited

U.S. PATENT DOCUMENTS

| | | | |
|---|---|---|---|
| 6,552,323 B2 * | 4/2003 | Guidash | ............ H01L 27/14609 250/208.1 |
| 6,587,146 B1 * | 7/2003 | Guidash | ............ H01L 27/14603 257/239 |

(Continued)

FOREIGN PATENT DOCUMENTS

| | | |
|---|---|---|
| JP | 2004-056048 A | 2/2004 |
| JP | 2005-065184 A | 3/2005 |

(Continued)

OTHER PUBLICATIONS

English language abstract of JP 2005-065184 A.
(Continued)

*Primary Examiner* — Trung Diep
(74) *Attorney, Agent, or Firm* — Marshall & Melhorn, LLC

(57) ABSTRACT

Disclosed is a CMOS image sensor comprising a unit pixel which includes a photodetector (e.g., photodiode); an erasing transistor which, being connected to the photodetector, controls the exposure integration time of the photodetector by time division; a charge storage (e.g., floating diffusion region) in which the charge accumulated in the photodetector is transferred and stored; and a transfer transistor which, being connected between the photodetector and the charge storage, transfers the charge accumulated in the photodetector to the charge storage; wherein a first signal charge accumulated in the photodetector during the first exposure integration time is transferred to the charge storage and stored therein, and the second signal charge is accumulated in the photodetector during the second exposure integration time, thereby sequentially reading out signals in response to the first signal charge and the second signal charge at a time of sampling out the information on signal charge stored in the unit pixel.

8 Claims, 8 Drawing Sheets

(51) Int. Cl.
*H04N 5/235* (2006.01)
*H04N 5/355* (2011.01)
*H04N 5/353* (2011.01)
*H04N 5/3745* (2011.01)

(52) U.S. Cl.
CPC ........... *H04N5/2354* (2013.01); *H04N 5/3535* (2013.01); *H04N 5/3559* (2013.01); *H04N 5/35536* (2013.01); *H04N 5/37452* (2013.01); *H04N 2209/048* (2013.01)

(56) References Cited

U.S. PATENT DOCUMENTS

| | | | | |
|---|---|---|---|---|
| 6,803,958 | B1* | 10/2004 | Wang | H04N 5/243 348/308 |
| 7,432,540 | B2* | 10/2008 | McKee | H01L 27/14603 250/208.1 |
| 8,797,434 | B2 | 8/2014 | Lee et al. | |
| 2003/0137594 | A1* | 7/2003 | Koizumi | H01L 27/14609 348/308 |
| 2009/0073289 | A1* | 3/2009 | Xu | H01L 27/14609 348/243 |
| 2010/0231771 | A1* | 9/2010 | Yaghmai | H04N 5/35581 348/308 |

FOREIGN PATENT DOCUMENTS

| | | |
|---|---|---|
| KR | 10-2008-0058560 A | 6/2008 |
| KR | 10-0835894 B1 | 6/2008 |

OTHER PUBLICATIONS

English language abstract of JP 2004-0546048A.
English language abstract of KR 10-2008-0058560 A.
English language abstract of KR 10-0835894 B1.
Written Opinion of the International Searching Authority (Translation).
Korean Intellectual Property Office, Written OPinion of the International Searching Authority, Daejon, Republic of Korea, May 7, 2012.

* cited by examiner

WIDE DYNAMIC RANGE CMOS IMAGE SENSOR AND IMAGE SENSING METHOD

TECHNICAL FIELD

The present invention relates to a Complementary Metal Oxide Semiconductor (CMOS) image sensor with a wide dynamic range of light intensity and image sensing method to be operated thereof.

BACKGROUND ART

The present invention relates to a structure of a sensor designed to get a CMOS image sensor acting in a wide dynamic range of light intensity and a method of obtaining image signals according to the structure.

A CMOS image sensor is a type of sensor made by using the manufacturing technology of CMOS, which converts the incident light onto each pixel of the sensor to electrons by using photodiode, and outputs a voltage signal in proportion to the number of electrons thereby forming an image.

The dynamic range of a conventional CMOS image sensor, in which the sensor properly responds to light intensity is about 60 dB. That is to say, it can normally output a signal ranging from the least sensible intensity of light to about 1,000 times brighter light. Various attempts have been made to expand the dynamic range of a CMOS image sensor.

For example, U.S. Pat. No. 7,443,427 discloses a pixel structure with a logarithmic response, and U.S. Pat. Nos. 7,442,910 and 7,209,166 disclose methods for increasing the dynamic range by changing a storage capacitor for electrons within a pixel, via manipulation of switches.

Further, Korean Patent Nos. 0835894 and 0865111, and U.S. Pat. No. 7,489,352 disclose methods employing two sized photodiodes by which two signals with different light responsivity are outputted therefrom.

There are also other methods to increase the dynamic range of a sensor by repeatedly operating a transfer gate or reset transistor during the process of obtaining signals in a widely used pixel with a 4-transistor structure.

The above various solutions used for the expansion of the dynamic range have their own merits together with demerits, and thus it is difficult to say which one has the remarkable technical advantages.

SUMMARY OF INVENTION

Technical Problem

In an embodiment, the present invention provides a CMOS image sensor, which has a wide dynamic range of light intensity, and its unit pixel.

In another embodiment, the present invention provides a CMOS image sensor which does not require any additional process except a process for manufacturing the conventional 4-transistor CMOS image sensor pixel, and the unit pixel thereof.

Technical Solution

In an aspect, the present invention provides a CMOS image sensor comprising a unit pixel which includes a photodetector (e.g., photodiode);

an erasing transistor which, being connected to the photodetector, controls the exposure integration time of the photodetector by time division;

a charge storage (e.g., floating diffusion region) in which the charge accumulated in the photodetector is transferred and stored; and a transfer transistor which, being connected between the photodetector and the charge storage, transfers the charge accumulated in the photodetector to the charge storage;

wherein a first signal charge accumulated in the photodetector during the first exposure integration time is transferred to the charge storage and stored therein, and a second signal charge is accumulated in the photodetector during the second exposure integration time, thereby sequentially reading signals in response to the first signal charge and the second signal charge at a time of sampling out the information on the signal charge stored in the unit pixel.

In another aspect, the present invention provides a CMOS image sensor comprising a unit pixel, a first switch, and a second switch, wherein the unit pixel includes:

a photodiode;

an erasing transistor which, being connected between a source voltage and the photodiode, resets the photodiode;

a floating diffusion region in which the charge accumulated in the photodiode is transferred and stored;

a transfer transistor which, being connected between the photodiode and the floating diffusion region, transfers the charge accumulated in the photodiode to the floating diffusion region;

a reset transistor which resets the floating diffusion region;

an active transistor which detects electrical characteristics in the floating diffusion region; and an addressing transistor for outputting the signal of the active transistor; and wherein the first switch transfers the output signal of the addressing transistor to a first signal detect circuit, and the second switch transfers the output signal of the addressing transistor to a second signal detect circuit.

In a further aspect, the present invention provides a CMOS image sensor comprising a unit pixel which includes:

a photodiode;

an erasing transistor which, being connected between a source voltage and the photodiode, resets the photodiode;

a floating diffusion region in which the charge accumulated in the photodiode is transferred and stored;

a transfer transistor which, being connected between the photodiode and the floating diffusion region, transfers the charge accumulated in the photodiode to the floating diffusion region;

a reset transistor which resets the floating diffusion region;

an active transistor which detects electrical characteristics in the floating diffusion region;

a first addressing transistor which transfers the signal of the active transistor to a first output signal line; and a second addressing transistor which transfers the signal of the active transistor to a second output signal line.

In an embodiment of the present invention, the electron potential energy barrier by the erasing transistor at the time of turn-off is lower than that by the transfer transistor at the time of turn-off.

In another embodiment of the present invention, the CMOS image sensor may further include a row driver which supplies a higher turn-off voltage of the erasing transistor than that of the transfer transistor, while controlling the actions of configuration elements.

In a further aspect, the present invention provides an image sensing method including:

initiating the accumulation of a first signal charge during a first exposure integration time in a photodetector (e.g., photodiode);

terminating the accumulation of a first signal charge in the photodetector and transferring the first signal charge to a charge storage (e.g., floating diffusion region);

initiating the accumulation of a second signal charge during a second exposure integration time in the photodetector;

detecting electrical characteristics of the charge storage;

resetting the charge storage and detecting the electrical characteristics;

terminating the accumulation of a second signal charge in the photodetector and transferring the second signal charge to the charge storage; and detecting electrical characteristics of the charge storage.

In an embodiment of the present invention, the step of resetting the charge storage and detecting the electrical characteristics further includes:

detecting electrical characteristics of the charge storage reset through a first signal detecting circuit which responds to the first signal charge; and detecting electrical characteristics of the charge storage reset through a second signal detecting circuit which responds to the second signal charge.

BRIEF DESCRIPTION OF DRAWINGS

The accompanying drawings, which are included to provide a further understanding of the disclosure and are incorporated in and constitute a part of this application, illustrate embodiments of the invention and together with the description, serve to explain the principle of the invention. In the drawings.

DESCRIPTION OF EMBODIMENTS

Hereinafter, exemplary technical features of the present invention will be described with reference to the accompanying drawings.

In an embodiment, the present invention employs a CMOS image sensor including a unit pixel which includes a photodetector; an erasing transistor which, being connected to the photodetector, conduct a multiple control of the exposure integration time of the photodetector by time division; a charge storage in which the charge accumulated in the photodetector is transferred and stored therein; a transfer transistor which, being connected between the photodetector and the charge storage, transfers the charge accumulated in the photodetector to the charge storage; and an image sensing method, wherein, in the unit pixel, a first signal charge accumulated in the photodetector during a first exposure integration time is stored in the charge storage, and a second signal charge is accumulated in the photodetector during a second exposure integration time, thereby sequentially reading signals responding to the first signal charge and the second signal charge at a time of sampling out the information on the signal charge stored in the unit pixel.

BEST MODE OF INVENTION

Figure 1:
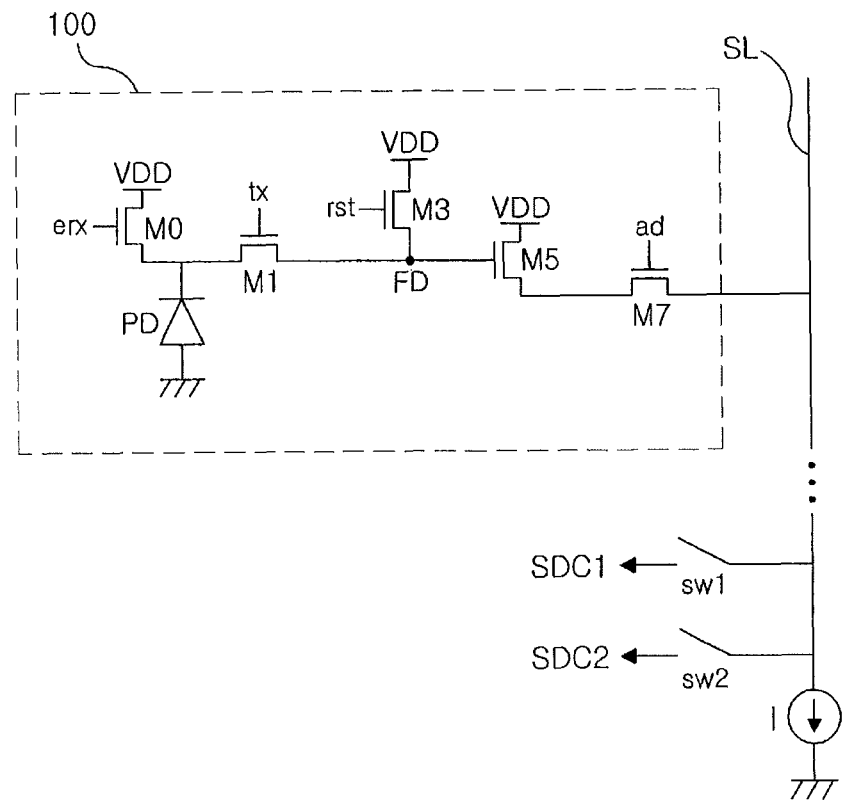
FIG. 1 is a circuit diagram illustrating a unit pixel and an output signal line of a CMOS image sensor according to an exemplary embodiment of the present invention.

FIG. 1 is a circuit diagram illustrating the constitution of a CMOS image sensor according to an exemplary embodiment of the present invention. The illustrated unit pixel 100 employs a photodiode (PD) as a photodetector which generates a signal charge in response to the incident light from the outside. In order to control the exposure integration time of the photodiode by time division, an erasing transistor is applied between the photodiode and source voltage.

Further, as a sensing circuit, a 4-Tr sensing structure which includes a transfer gate transistor (hereinafter, called to "transfer transistor"), a reset transistor, an active transistor operated in a source follower method, and an addressing transistor is applied.

In an embodiment, the charge storage is a floating diffusion region (FD) formed on the drain node of the transfer transistor. The capacitance of the floating diffusion region includes pn junction capacitance and the associated parasitic capacitance.

That is, in the illustrated circuit, a unit pixel 100 may include:

a photodiode (PD), of which anode is connected to ground and cathode to the following erasing transistor (M0) and transfer transistor (M1);

an erasing transistor (M0), which is connected between the cathode of the photodiode (PD) and the source voltage and controls the cumulative exposure of the photodetector;

a transfer transistor (M1), which transfers the charge accumulated in the photodetector (PD) to the following floating diffusion region (FD);

a floating diffusion region (FD), which is connected to the transfer transistor (M1) and stores the charge transferred from the photodiode (PD);

a reset transistor (M3), which resets the floating diffusion region (FD); an active transistor (M5), which detects electrical characteristics of the floating diffusion region (FD); and an addressing transistor (M7), which outputs the output signal of the active transistor (M5) into the exterior of the unit pixel 100.

In another embodiment, the illustrated image sensor further includes, in addition to the unit pixel 100, an output signal line (SL) connected to the addressing transistor (M7);

a first switch (SW1) for connecting/disconnecting the output signal line (SL) to/from a first signal detecting circuit (SDC1); and a second switch (SW2) for connecting/disconnecting the output signal line (SL) to/from a second signal detecting circuit (SDC2).

In a further embodiment, the first signal detecting circuit (SDC1) and the second signal detecting circuit (SDC2) may respectively include a sampling circuit and an analog digital converter (ADC).

In a still further embodiment, the present invention provides a method for obtaining a double exposure image by using the illustrated image sensor, which includes the steps of:

conducting a time division of the shuttering interval of the unit pixel 100 into a first exposure integration time and a second exposure integration time using the erasing transistor (M0);

accumulating the first signal charge in the photodiode (PD) during the first exposure integration time;

transferring the first signal charge to the floating diffusion region (FD) using the transfer transistor (M1) and storing the same therein;

accumulating the second signal charge to the photodiode (PD) during the second exposure integration time; and at a time of reading information on signal charge stored in the unit pixel, sequentially reading the signal from the output signal line (SL) in response to the first signal charge by the first signal detecting circuit (SDC1) through the first switch (SW1), and the signal from the output signal line (SL) responding to the second signal charge by the second signal detecting circuit (SDC2) through the second switch (SW2).

Here, the first exposure integration time and the second exposure integration time may be continued, and their length may differ from each other. For example, the first exposure integration time may be shorter than that of the second exposure. Here, a signal detected by the first signal charge is available as an image signal for a bright object, while a signal detected by the second signal charge is available as an image signal for a dark object.

Figure 2:
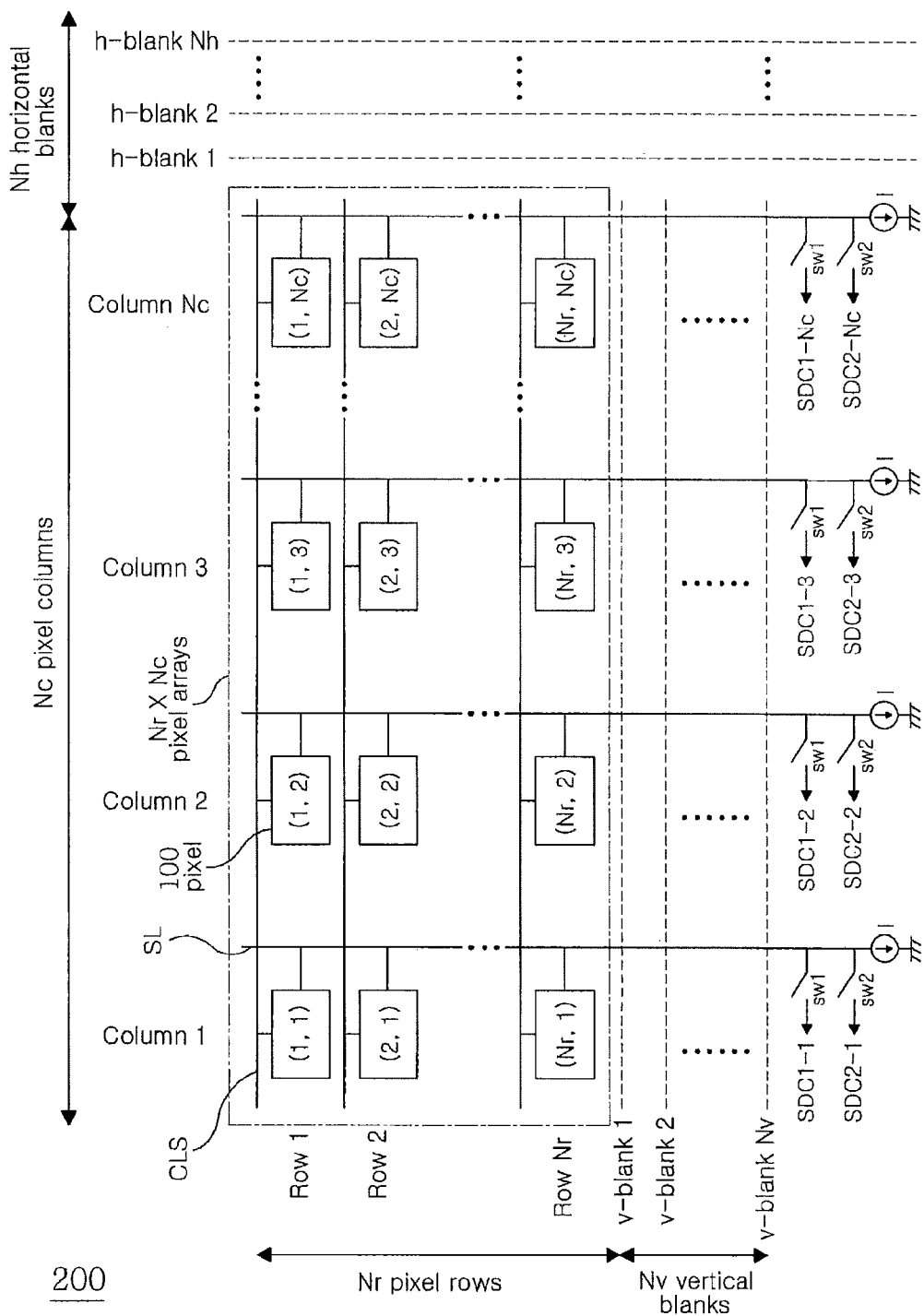
FIG. 2 is a block diagram illustrating a pixel array structure of a CMOS image sensor consisting of unit pixels of FIG. 1 according to an exemplary embodiment of the present invention.

The unit pixels 100 having the feature illustrated in FIG. 1 are arrayed to form the CMOS image sensor. FIG. 2 shows an embodiment of the CMOS image sensor with Nr×Nc array 200 established based on the unit pixels of FIG. 1.

Referring to FIG. 2, each unit pixel 100 is connected to an output signal line (SL) which is provided respectively in each column, and also connected to control signal lines (CLs) which are provided respectively in each row. For example, in the case of an image sensor with Nc number of columns it includes Nc number of output signal lines.

The control signal lines (CLs) supply a gate signal of an erasing transistor (erx), a gate signal of a transfer transistor (tx), a reset signal (rst) and an address signal (ad), and are common to unit pixels of each row. The control signal lines (CLs) designate a predetermined row in the image sensor 200, and thereby control the unit pixels in the corresponding row thereof.

Additionally, the CMOS image sensor 200 may further include Nv number of vertical blanks and Nh number of horizontal blanks as shown in FIG. 2. Vertical blanks and horizontal blanks are virtual pixel arrays inserted as required by the action of the image sensor according to time, and only a clock counting is assigned without a physical body. For example, a horizontal blank is used to control the operating time corresponding to a single row of the pixel array, and a vertical blank is used to control the time corresponding to a single frame.

A process of obtaining an image signal in a unit pixel 100 via photodiode (PD) includes a shuttering step and a sampling step during which the signal obtained by shuttering in the pixel are read out to the outside.

In order to achieve the object of the present invention, a shuttering interval for one image frame is divided into two parts of a first exposure integration time and a second exposure integration time. That is, the shuttering is achieved with regard to the first exposure integration time and the second exposure integration time. In the meantime, the illustrated image sensor provides an output signal line per each column and transfers the obtained signal to the outside of the unit pixel.

The amount to signal charge is proportional to the number of signal electrons accumulated in the photodiode (PD) exposed to the light during each of the exposure integration time. The output voltage signal which is in turn proportional to the amount of signal charge is sequentially outputted to the output signal line (SL) from the sampling action of reading the signal. When the signal by the first exposure integration time is outputted to the output signal line (SL), a first switch (SW1) is turned on to transfer the signal to a first signal detecting circuit (SDC1), and when the signal by the second exposure integration time is outputted to the output signal line (SL), a second switch (SW2) is turned on to transfer the signal to a second signal detecting circuit (SDC2). Thereby each signal transferred to the respective signal detecting circuit is converted into a digital image signal value of the pixel 100.

Figure 3:
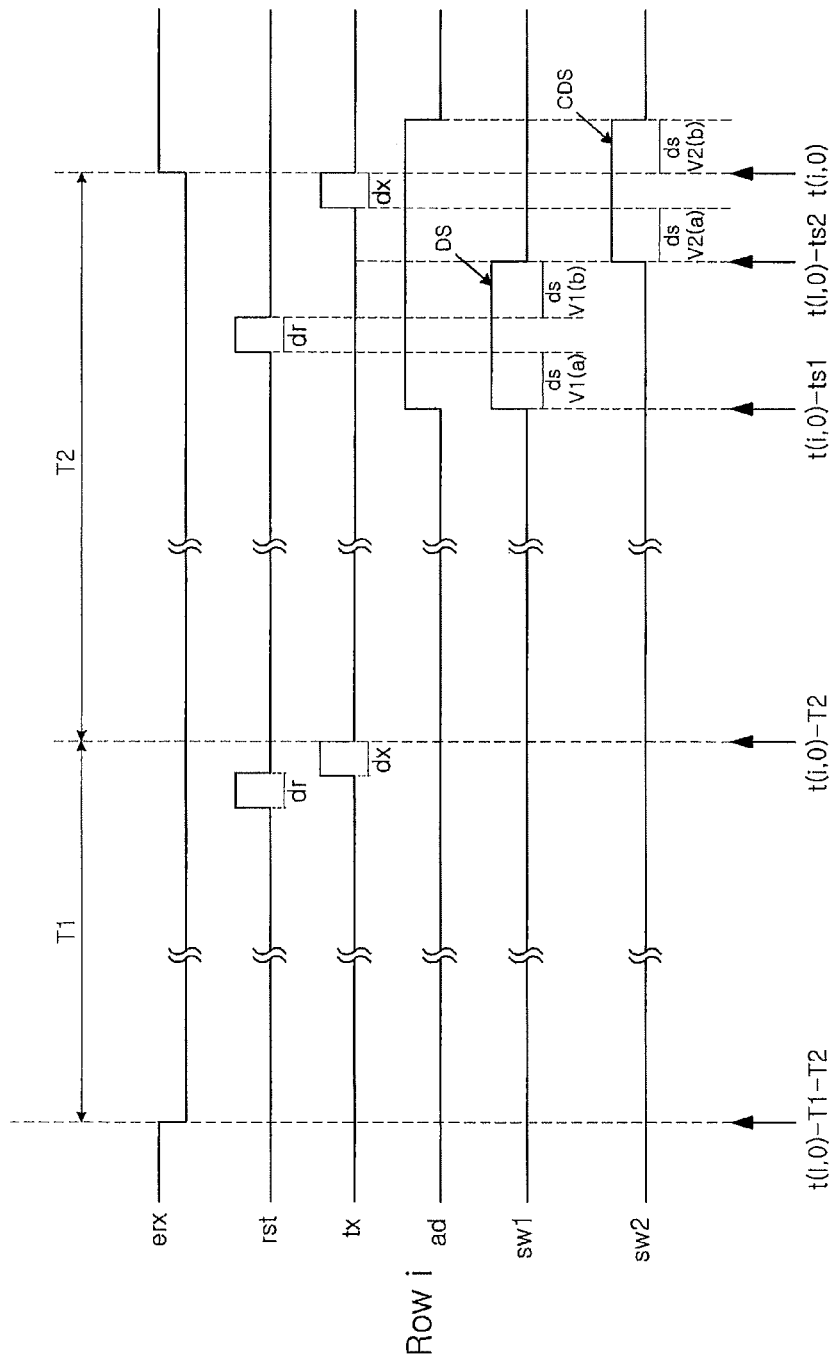
FIG. 3 is a timing diagram illustrating an acquisitive action for detecting a signal by a CMOS image sensor according to an exemplary embodiment of the present invention.
Figure 4:
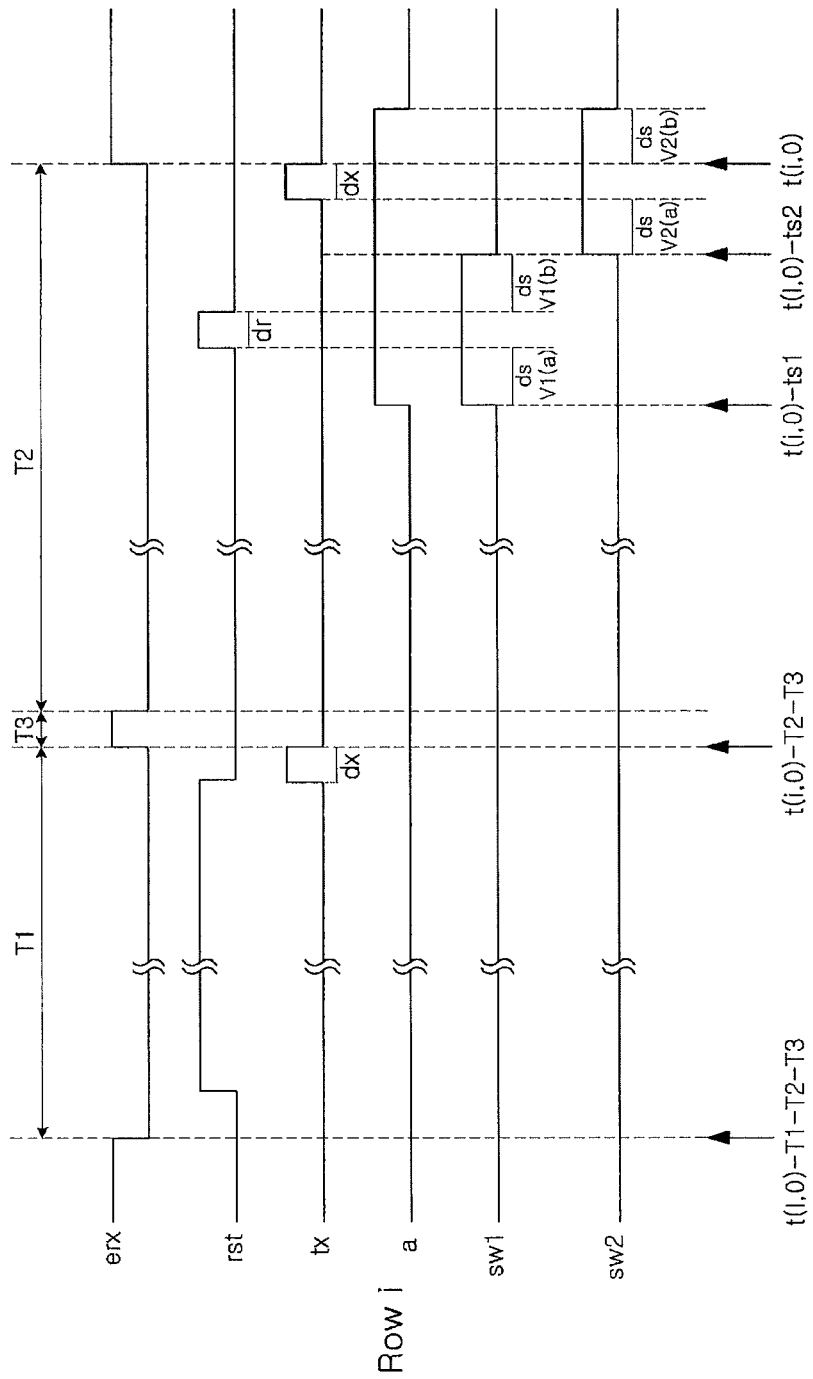
FIG. 4 is a timing diagram illustrating an acquisitive action for detecting a signal by a CMOS image sensor according to another exemplary embodiment of the present invention.

The timing diagrams in FIGS. 3 and 4 illustrate an image sensing method in a unit pixel of FIG. 1 embodied in an N type transistor. In addition, with reference to the N type transistor, the voltage when each of erx, tx, rst and ad signals turns on the corresponding transistor is called "logic high" and the voltage when each of erx, tx, rst and ad signals turns off the corresponding transistor is called "logic low". Certainly, when the pixel 100 in FIG. 1 is embodied in a P type transistor, the voltage should be "logic low" so that the transistor can be turned on.

The timing diagrams in FIGS. 3 and 4 are operated in a rolling shuttering method, and each row sequentially proceeds in the pixel array in FIG. 2. For example, all the actions (shuttering and sampling) in the $(i+1)^{th}$ row (Row i+1) are the same as those in the $i^{th}$ row (Row i) expect that they are occurred later with a time interval assigned in each row. Therefore, the action of the $i^{th}$ row is explained without loss of the generality.

The timing diagram for the exposure of the $i^{th}$ row and signal sampling is the same as in FIG. 3. The first exposure integration time (T1) and the second exposure integration time (T2) are continued.

When the time that the second exposure in the $i^{th}$ row finishes is set at t(i, 0), the erasing signal (erx) turns off at time (i, 0)−T1−T2, and photo-conversion electrons, i.e., signal charge, starts to accumulate in the photodiode (PD). The reset signal (rst) is turned on at time t(i, 0)−T2−dr−dx and "turn-on" state is maintained for a period of dr hours, turned off at time t(i, 0)−T2−dx and resets the floating diffusion region (FD).

Then, a transfer signal (tx) is turned on and maintained for a period of dx hour, turned off at time t(i, 0)−T2, and the first signal charge accumulated in the photodiode (PD) during the first exposure integration time (T1) is transferred to the floating diffusion region (FD) and stored therein. When all the first signal charge is transferred to the floating diffusion region (FD), the photodiode (PD) becomes empty of signal charge. Then, the erasing signal (erx) is maintained in "turn-off" state until the time of t(i, 0), and thereby the second signal charge is accumulated again in the photodiode (PD) during the second exposure integration time (T2).

In the above actions, it is preferable that the gate turn-off voltage of the erasing transistor is higher than that of the transfer transistor so that the excess photo-electrons from the saturated photodiode (PD) should not flow into the floating diffusion region but be released through the erasing transistor.

A sampling action which reads a signal by outputting it from a pixel is described as below.

At time t(i, 0)−ts1, an addressing transistor (M7) and a first switch (SW1) are respectively turned on, and connect an output terminal of the active transistor (M5) to output signal line (SL) and connect the output signal line (SL) to an input terminal of a first signal detecting circuit (SDC1). The signal (V1(a)) corresponding to the voltage of the floating diffusion region (FD), which stores the first signal charge accumulated during the first exposure integration time (T1), is transferred to the first signal detecting circuit (SDC1).

Then, the reset transistor (M3) is turned on and turned off after dr hour, and reset the floating diffusion region (FD). The signal V1(b), which corresponds to the voltage of the reset floating diffusion region (FD), is again transferred to the first signal detecting circuit (SDC1). The difference between V1(a) and V1(b) outputted by the double sampling (DS) process, i.e., V1=[V1(b)−V1(a)], is converted to a digital code value in the first signal detecting circuit (SDC1).

Then, at time t(i, 0)−ts2, the first switch (SW1) is turned off and the second switch (SW2) is turned on to thereby connect the signal output line (SL) to an input terminal of a second signal detecting circuit (SDC2). The signal V2(a), which corresponds to the voltage of the reset floating diffusion region (FD) is transferred to the second signal detecting circuit (SDC2).

Then, at time t(i, 0)−T2−dx, the transfer transistor (M1) is turned on and starts to transfer the photo-electrons accumulated in the photodiode (PD) to the floating diffusion region (FD), and at time t(i, 0)−T2, the transfer transistor (M1) is turned off Immediately after the transfer transistor (M1) is turned off, the erasing transistor (M0) is turned on to thereby prevent the accumulation of photo-electrons in the photodiode (PD).

As a result, the second signal charge accumulated in the photodiode (PD) during the second exposure integration time (T2) is stored in the floating diffusion region (FD). Here, the signal V2(b) corresponding to the voltage of the floating diffusion region (FD) is transferred to the second signal detecting element (SDC2). The difference between V2(a) and V2(b) outputted by the correlated double sampling (DS) process, i.e., V2=[V2(b)−V2(a)], is converted to a digital code value in the second signal detecting circuit (SDC2).

Then, the second switch (SW2) and the addressing transistor (M7) are both turned off and the signal sampling process for the $i^{th}$ row is completed.

The image sensing method illustrated as a timing diagram in FIG. 3 is summarized as below.

The illustrated image sensing method includes the steps of:
initiating the accumulation of signal charge in the photodiode (PD) corresponding the first exposure integration time from t(i, 0)−T1−T2;
terminating the accumulation of signal charge in the photodiode (PD) corresponding the first exposure integration time, and transferring the signal charge accumulated during the first exposure integration time to the floating diffusion region for the time from t(i, 0)−T2−dx to t(i, 0)−T2;
initiating the accumulation of signal charge in the photodiode (PD) corresponding the second exposure integration time from t(i, 0)−T2;
detecting the electrical characteristics of the floating diffusion region (FD) in the first signal detecting circuit (SDC1) for t(i, 0)−ts1 to t(i, 0)−ts1+ds;
turning on the reset transistor (M3) to reset the floating diffusion region (FD) and detecting the electrical characteristics from t(i, 0)−ts1+ds;
terminating the accumulation of signal charge in the photodiode (PD) corresponding the second exposure integration time, and transferring the signal charge to the floating diffusion region for the time from t(i, 0)−dx to t(i, 0); and
detecting the electrical characteristics of the floating diffusion region (FD) in the second signal detecting circuit (SDC2) for the time from t(i, 0) to t(i, 0)+ds.

Here, the step of resetting the floating diffusion region and detecting the electrical characteristics may be further divided into:
after turning on the first switch (SW1) and turning off the second switch (SW2), and then detecting the electrical characteristics of the reset floating diffusion region (FD) in the first signal detecting circuit (SDC1) for the time from t(i, 0)−ts1+ds+dr to t(i, 0)−ts2; and
successively turning off the first switch (SW1) and turning on the second switch (SW2), and then detecting the electrical characteristics of the reset floating diffusion region (FD) in the second signal detecting circuit (SDC2) for the time from t(i, 0)−ts2 to t(i, 0)−dx.

FIG. 4 is a timing diagram illustrating the image sensing method according to another embodiment of the present invention.

The timing diagram in FIG. 4 differs from that in FIG. 3 in that it further includes an interval (T3) between the first exposure integration time (T1) and the second exposure integration time (T2) during which the erasing transistor (M0) turns on.

The timing diagram in FIG. 4 shows a longer time than that in FIG. 3 by T3. However, the T3 interval included after the first exposure integration time helps to surely remove the signal charge remaining in the photodiode (PD). The details of the timing diagram in FIG. 4 are similar to those in FIG. 3 except the differences mentioned above, and thus other overlapping explanations are abbreviated herein.

Figure 5:
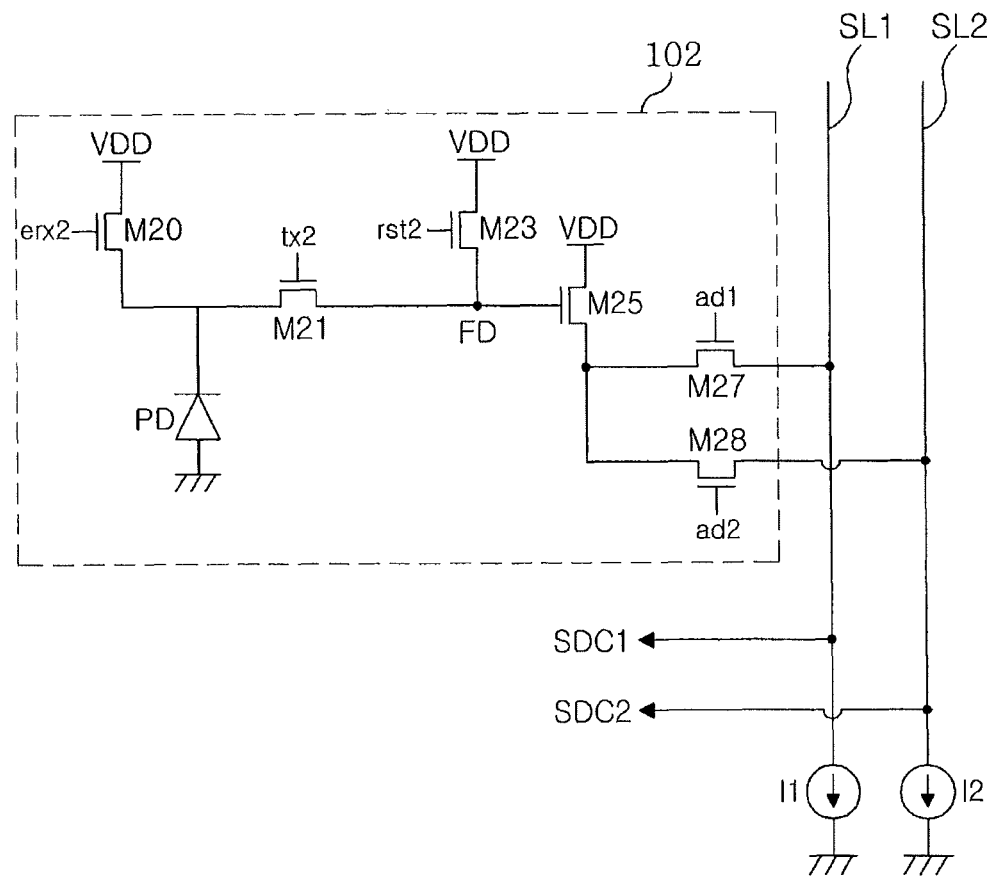
FIG. 5 is a circuit diagram illustrating a unit pixel and two output signal lines of a CMOS image sensor according to another exemplary embodiment of the present invention.

FIG. 5 is a circuit diagram illustrating the configuration of a CMOS image sensor according to another embodiment of the present invention.

The illustrated unit pixel 102 applied a photodiode (PD) which generates a signal charge in response to the incident light from the outside. In order to control the accumulated exposure of the photodiode (PD) via time division, an erasing transistor was applied between the photodiode (PD) and a source voltage.

Further, as a sensing circuit, a structure similar to the 4-Tr sensing structure consisting of a transfer transistor, a reset transistor, an active transistor operated by source follower method, and an addressing transistor. Here, the charge storage is a floating diffusion region (FD) formed in the drain node of the transfer transistor.

The capacitance of the floating diffusion region includes pn junction capacitance and the associated parasitic capacitance. That is, a unit pixel 102 includes:
a photodiode (PD) where an anode is connected to ground and a cathode is connected to the following erasing transistor (M20) and transfer transistor (M21);
an erasing transistor (M20) which is connected between the cathode of the photodiode (PD) and the source voltage and controls the exposure integration time of the photodiode (PD);
a transfer transistor (M21) which transfers the charge accumulated in the photodiode (PD) to the following floating diffusion region (FD);

a floating diffusion region (FD) which, as being connected to the transfer transistor (M21), stores charge transferred from the photodiode (PD);

a reset transistor (M23) for resetting the floating diffusion region (FD);

an active transistor (M25) for detecting the electrical characteristics of the floating diffusion region (FD); and two addressing transistors of (M27) and (M28).

The illustrated image sensor may further include, in addition to the unit pixel 102:

a first output signal line (SL1) connected to the addressing transistor (M27);

a second output signal line (SL2) connected to the addressing transistor (M28);

a first signal detecting circuit (SDC1) connected to the first output signal line (SL1); and a second signal detecting circuit (SDC2) connected to the second output signal line (SL2).

The first signal detecting circuit (SDC1) and the second signal detecting circuit (SDC2) may respectively include a sampling circuit and an analog digital converter (ADC).

In an embodiment, the present invention provides a method of obtaining a double exposure image using the illustrated image sensor including:

conducting a time division of the shuttering interval in the unit pixel 102 into the first exposure integration time and the second exposure integration time by using the erasing transistor (M20), and accumulating the first signal charge in the photodiode (PD) during the first exposure integration time;

transferring the first signal charge into the floating diffusion region (FD), i.e., a charge storage, by using the transfer transistor (M21) and storing therein;

accumulating the second signal charge in the photodiode (PD) during the second exposure integration time; and at a time of reading the signal in the unit pixel, sequentially reading the signal transferred through the first addressing transistor (M27) to the first output signal line (SL1) in response to the first signal charge by the first signal detecting circuit (SDC1), while reading the signal transferred through the second addressing transistor (M28) to the second output signal line (SL2) in response to the second signal charge by the second signal detecting circuit (SDC2).

Figure 6:
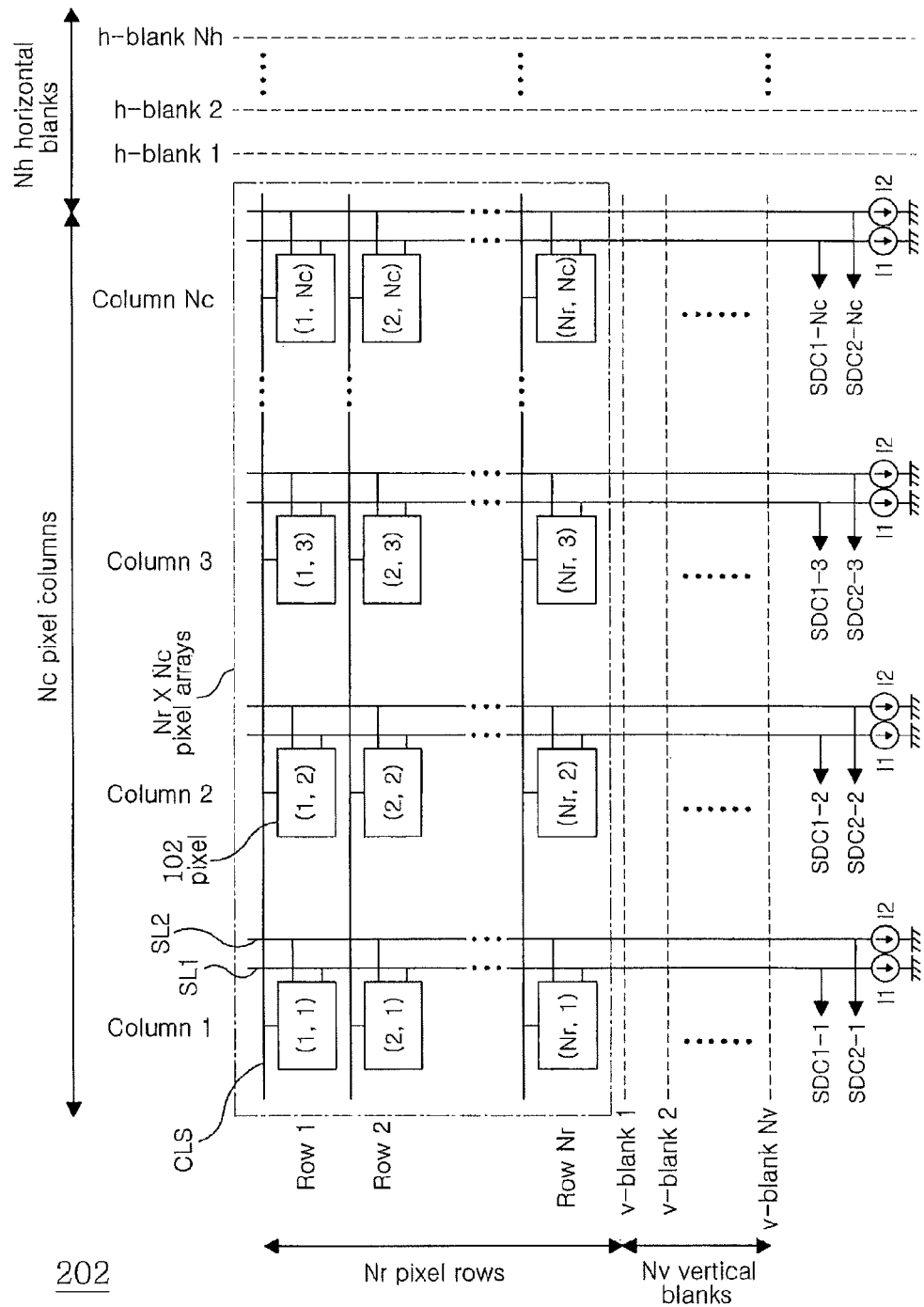
FIG. 6 is a block diagram illustrating a pixel array structure of a CMOS image sensor consisting of unit pixels of FIG. 5 according to an exemplary embodiment of the present invention.

The pixels 102 with a configuration of FIG. 5 as explained above are arrayed to form a CMOS image sensor of the present invention. FIG. 6 shows an embodiment of the CMOS image sensor 202 with an Nr×Nc array established based on the pixels of FIG. 5.

Referring to FIG. 6, each unit pixel 102 is connected to two first output signal line (SL1) and the second output signal line (SL2) separately provided in each column, and also connected to the control signal lines (CLs) provided in each row. Since two first output signal line (SL1) and second output signal line (SL2) are provided in each column, in the case of an image sensor with Nc number of column, there are Nc×2 output signal lines.

The control signal lines (CLs) provide a gate signal of an erasing transistor (erx2), a gate signal of a transfer transistor (tx2) a reset signal (rst2), and a first and a second addressing signals (ad1, ad2), and are common to the unit pixel in each row. The control signal line (CLs) designate a predetermined row of an image sensor 202 and control the unit pixel of the row.

Additionally, the CMOS image sensor 202 may further include Nv number of vertical blanks and Nh number of horizontal blanks as shown in FIG. 6.

In an embodiment of the present invention, the process of obtaining an image signal by the unit pixel 102 includes a shuttering step and a sampling step during which the signal obtained by shuttering in the pixel are read out to the outside.

To achieve the object of the present invention, a shuttering interval for a single image frame is divided into two parts of the first exposure integration time and the second exposure integration time. That is, the shuttering is achieved with respect to the first exposure integration time and the second exposure integration time.

Figure 7:
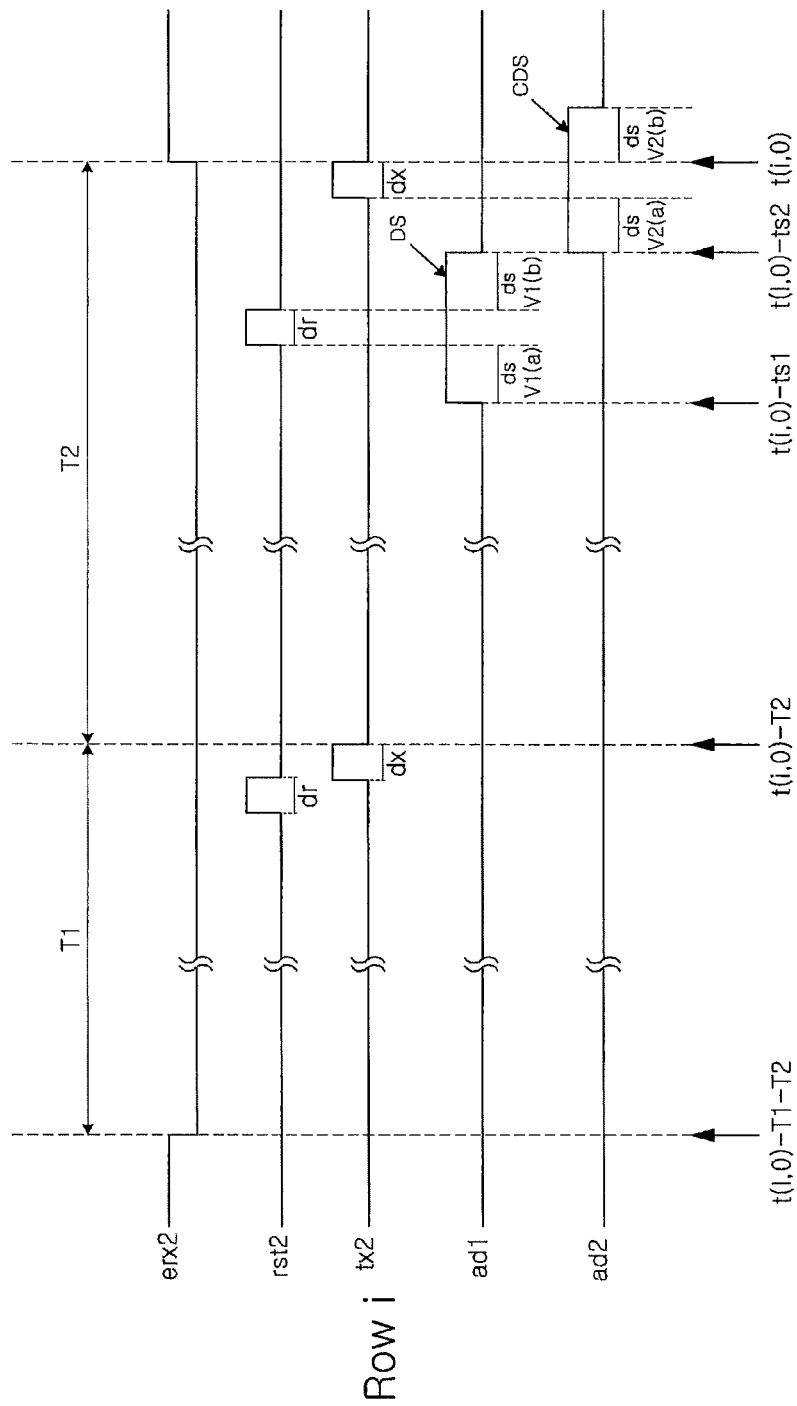
FIG. 7 is a timing diagram illustrating an acquisitive action for detecting a signal by a CMOS image sensor according to an exemplary embodiment of the present invention.

The timing diagram in FIG. 7 is for the image sensing method in the unit pixel of FIG. 5 embodied by a N type transistor.

Comparing the timing diagram in FIG. 3 with that FIG. 7, it is noted that the first addressing signal (ad1) and the addressing signal (ad2) in FIG. 7 are similar to the first switching signal (sw1) and the second switching signal (sw2) in FIG. 3. This implies that the first addressing transistor (M27) and the second addressing transistor (M28) of FIG. 5 serve the roles of the first switch and the second switch in FIG. 1. Otherwise, the details of the timing diagram in FIG. 7 can be inferred from that of FIG. 3, and thus the explanation that may overlap between them will be abbreviated.

Figure 8:
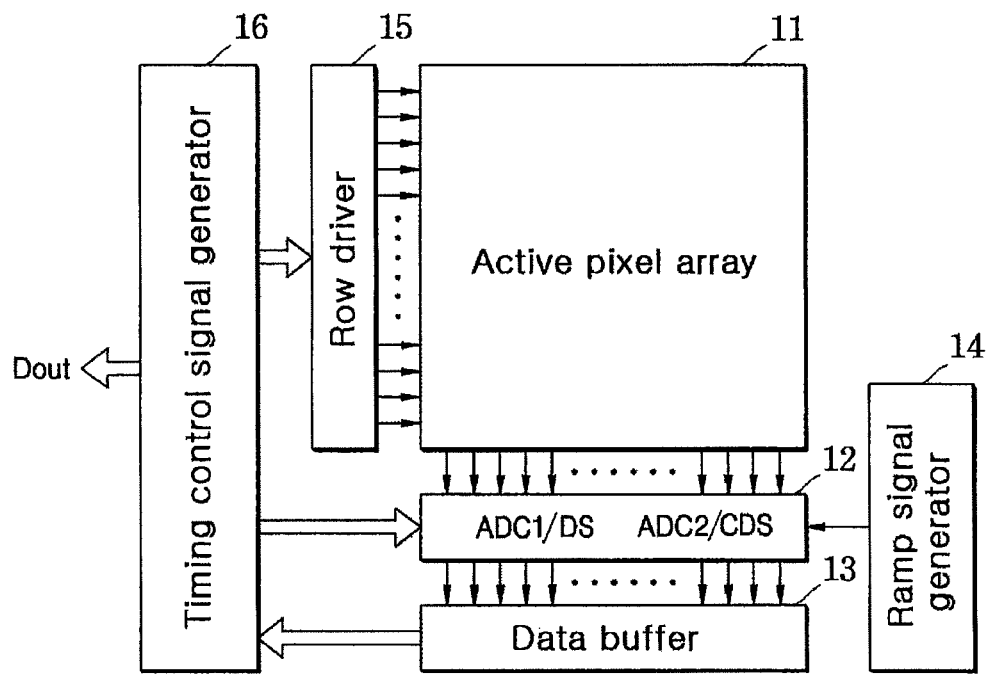
FIG. 8 is a block diagram illustrating a pixel matrix structure and a control configuration of a CMOS image sensor according to an exemplary embodiment of the present invention.

FIG. 8 shows an image sensor block which operates an image sensor according to an embodiment of the present invention via column-parallel method.

The illustrated image sensor block in a column-parallel method may include an active pixel array 11 consisting of unit pixels according to an embodiment of the present invention; a converting circuit 12 for converting the values sensed by the unit pixels into digital image signals; data buffer 13; a ramp signal generator 14; a row driver 15 for controlling the actions of the unit pixels; and a timing control signal generator 16 for controlling the action timing of the row driver 15 and the converting circuit 12.

The active pixel array 11 may be achieved by the array of the unit pixels consisting of five or six transistors and a single photodiode according to an embodiment of the present invention. That is, it may be provided with the unit pixels of FIG. 1 and the pixel array of FIG. 2 or the unit pixel of FIG. 5 and the pixel array of FIG. 6.

For the converting circuit 12, single-slope ADC was applied so that analog digital conversion may be performed simultaneously in all columns in each row. That is, it may be provided with ADC1 for converting the signal of the first exposure integration time and ADC2 for converting the signal of the second exposure integration time.

The converting circuit 12 converts the output signal from the pixel array 11 via correlated double sampling (CDS) or double sampling (DS) by using the ramp signal, and a plurality of switches, capacitors and inverters included. The ramp signal used by the converting circuit 12 is generated in the ramp signal generator 14 of FIG. 8.

The actions of the CMOS image sensor block to achieve the object of the present invention will be described herein below. Although the actions of the row driver 15 and the converting circuit 12 are due to the timing control by the timing control signal generator 16, the actions will be explained with respect to the row driver 15 and the converting circuit 12 for convenience purpose.

First, among the configuration elements of FIG. 8, a case of the action in which the active pixel array 11 consists of unit pixels 100 illustrated in FIG. 1 according to an embodiment of the present invention.

The row driver 15 in FIG. 8 provides the control signals of FIG. 1 (erx, tx, rst, ad, sw1, sw2), and the converting circuit 12 of FIG. 8 converts the signals out from the output signal line (SL) into digital image signals via CDS and/or DS method, and delivers them into the data buffer 13.

Next, among the configuration elements of FIG. 8, a case of the action in which the active pixel array 11 consists of unit pixels 102 illustrated in FIG. 5 according to an embodiment of the present invention.

The row driver 15 provides the control signals of FIG. 5 (erx2, tx2, rst2, ad1, ad2), and the converting circuit 12 converts the signals out from the output signal line pairs (SL1, SL2) into digital image signals via CDS or DS method, and delivers them into the data buffer 13.

Advantageous Effects of Invention

The CMOS image sensor of the present invention has advantages of having a wide dynamic range over the intensity of light. For example, the CMOS image sensor of the present invention has greatly improved the dynamic range of the image sensor responding to the intensity of light by dividing the shuttering interval of a photodiode to multiple exposure integration times and reading out plurality of accumulated signals from the unit pixel at a sampling time in parallel. Further, the CMOS image sensor of the present invention does not require any additional memory outside the pixel array for dynamic range expansion, and also its image processing is relatively simple. Additionally, it does not require any additional process to fabricate the unit pixel of the CMOS image sensor of the present invention except the process for manufacturing the conventional 4-Tr image sensor pixel.

While an exemplary embodiment of the present invention has been described in detail, the protection scope of the present invention is not limited to the foregoing embodiment and it will be appreciated by those skilled in the art that various modifications and improvements using the basic concept of the present invention defined in the appended claims are also included in the protection scope of the present invention.

The invention claimed is:

1. A CMOS image sensor comprising a unit pixel which includes:
   a photodetector;
   an erasing transistor which, being connected to the photodetector, controls the exposure integration time of the photodetector by time division;
   a charge storage in which the charge accumulated in the photodetector is transferred and stored;
   an active transistor which detects electrical characteristics in the charge storage;
   a transfer transistor which, being connected between the photodetector and the charge storage, transfers the charge accumulated in the photodetector to the charge storage;
   wherein a first signal charge accumulated in the photodetector during the first exposure integration time is transferred to the charge storage and stored therein, and a second signal charge is accumulated in the photodetector during a second exposure integration time, thereby sequentially reading signals responding to the first signal charge and the second signal charge at a time of sampling out the information on signal charge stored in the unit pixel; and
   wherein resetting the charge storage and detecting electrical characteristics further comprising the detecting electrical characteristics of the charge storage reset through a first signal detecting circuit which responds to the first signal charge; and detecting electrical characteristics of the charge storage reset through a second signal detecting circuit which responds to the second signal charge.

2. A CMOS image sensor comprising a unit pixel, a first switch and a second switch, wherein the unit pixel includes:
   a photodiode;
   an erasing transistor which, being connected between a source voltage and the photodiode, resets the photodiode;
   a floating diffusion region in which the charge accumulated in the photodiode is transferred and stored;
   a transfer transistor which, being connected between the photodiode and the floating diffusion region, transfers the charge accumulated in the photodiode to the floating diffusion region;
   a reset transistor which resets the floating diffusion region;
   an active transistor which detects electrical characteristics in the floating diffusion region; and
   an addressing transistor for outputting the signal of the active transistor; and
   the first switch transfers the output signal of the addressing transistor to a first signal detect circuit, and the second switch transfers the output signal of the addressing transistor to a second signal detect circuit, and
   wherein resetting the charge storage and detecting electrical characteristics further comprising the detecting electrical characteristics of the charge storage reset through a first signal detecting circuit which responds to the first signal charge; and detecting electrical characteristics of the charge storage reset through a second signal detecting circuit which responds to the second signal charge.

3. A CMOS image sensor comprising a unit pixel which includes:
   a photodiode; an erasing transistor which, being connected between a source voltage and the photodiode, resets the photodiode;
   a floating diffusion region in which the charge accumulated in the photodiode is transferred and stored;
   a transfer transistor which, being connected between the photodiode and the floating diffusion region, transfers the charge accumulated in the photodiode to the floating diffusion region;
   a reset transistor which resets the floating diffusion region;
   an active transistor which detects electrical characteristics in the floating diffusion region;
   a first addressing transistor, included in the unit pixel, which transfers the signal of the active transistor to a first output signal line; and a second addressing transistor, included in the unit pixel, which transfers the signal of the active transistor to a second output signal line.

4. A CMOS image sensor according to claim 2 or claim 3, wherein the electron potential energy barrier by the erasing transistor at the time of turn-off is lower than that by the transfer transistor at the time of turn-off.

5. A CMOS image sensor according to claim 4, wherein the turn-off voltage of the erasing transistor is higher than that of the transfer transistor.

6. A CMOS image sensor according to claim 3, further comprising a first signal detecting circuit, which is connected to the first output signal line, and a second signal detecting circuit, which is connected to the second output signal line.

7. An image sensing method comprising:
   initiating the accumulation of a first signal charge during a first exposure integration time in a photodetector;
   terminating the accumulation of a first signal charge in the photodetector and transferring the first signal charge to a charge storage;
   initiating the accumulation of a second signal charge during a second exposure integration time in the photodetector;

detecting electrical characteristics of the charge storage;

resetting the charge storage and detecting the electrical characteristics;

terminating the accumulation of a second signal charge in the photodetector and transferring the second signal charge to the charge storage; detecting electrical characteristics of the charge storage, and wherein the step of resetting the charge storage and detecting the electrical characteristics further comprises: detecting electrical characteristics of the charge storage reset through a first signal detecting circuit which responds to the first signal charge; and detecting electrical characteristics of the charge storage reset through a second signal detecting circuit which responds to the second signal charge.

8. The image sensing method according to claim 7, wherein the step of resetting the charge storage and detecting the electrical characteristics further comprises:

detecting electrical characteristics of the charge storage reset through a first signal detecting circuit which responds to the first signal charge; and detecting electrical characteristics of the charge storage reset through a second signal detecting circuit which responds to the second signal charge.

* * * * *